United States Patent Office 3,186,908
Patented June 1, 1965

3,186,908
CALCIUM LACTOBIONATE STABILIZATION OF LABILE ANTIGENIC VIRUS VACCINE MATERIALS
Wilton A. Rightsel, Grosse Pointe Woods, and Edward E. Schuler, Detroit, Mich., assignors to Parke, Davis & Company, Detroit, Mich., a corporation of Michigan
No Drawing. Filed Aug. 16, 1962, Ser. No. 217,293
13 Claims. (Cl. 167—78)

This invention relates to improvements in virus antigens such as virus vaccines and to methods for producing antigenic materials. More particularly, the invention relates to virus materials having increased antigenic stability.

Inasmuch as commercial virus materials in general tend to lose antigenic potency when held in storage, it has been proposed in the past to incorporate therewith a stabilizing substance to maintain or stabilize the potency for prolonged periods. Various stabilizing substances have been described for this purpose. In the case of vaccine production, the problem is complicated by the fact that process steps may be required in which the vaccine pool is freeze-dried to obtain a non-aqueous product or is simply frozen to achieve a condition of maximum stability and then thawed as required to provide a fluid product for filling into vials. Where, as is usually the practice in commercial manufacture, the vaccine pool exceeds the quantity required for immediate filling, the excess vaccine must be refrozen and held until such time as additional vaccine is needed for further filling. This unavoidably results in a number of freeze-and-thaw cycles which, having an adverse effect in the absence of a suitable stabilizing substance, leads to the premature loss of antigenic potency. In this connection, it is known that high concentrations of salts have a deleterious effect on antigenic potency. Therefore, the use of salts as stabilizers has been contra-indicated. Salt concentration is a particular problem in drying because it progressively increases during removal of water from the aqueous product, thereby increasingly exposing the antigenic factors to possible deterioration. Also, the addition of salts has the effect of lowering the temperature at which a fluid product can be converted to the solid state. Hygroscopic materials are likewise contra-indicated because in high concentration they form syrups which are difficult to handle, particularly during the drying operation.

It is therefore an object of the invention to provide virus materials which have increased antigenic stability especially during freeze-drying or when held in storage or in process for prolonged periods.

It is also an object to provide fluid virus materials which can be subjected to successive freezing and thawing without substantial loss of antigenic potency.

Another object is to provide stabilized vaccines.

A further object is to provide fluid virus materials which can be reduced to non-hygroscopic solid forms without formation of syrups and which when reconstituted with water or otherwise processed can be used as vaccines for immunogenic or prophylactic purposes.

A still further object is to provide means for stabilizing virus materials.

These and other objects, features and advantages, which will be apparent from the following description of the invention, are realized by providing virus antigens comprising a minor proportion of the salt known as calcium lactobionate. Advantageously, the products of the invention containing calcium lactobionate are antigenically stable and maintain their desired potency over prolonged periods. Since the presence of added salts in vaccine and antigen materials is ordinarily undesirable, it is surprising that the products of the invention which contain the added salt, calcium lactobionate, are far superior to like materials which do not contain calcium lactobionate, with respect to antigenic stability. Moreover, the fluid antigens of the invention can be reduced to a dry, flaky powder without formation of difficulty manageable syrups or other hygroscopic forms. Another unexpected advantage is that whereas it is generally necessary to freeze many types of vaccine and maintain them at extremely low temperature in order to achieve maximum stability during storage, the products of the invention can be kept while frozen at significantly higher temperature for long periods without substantial loss of potency. For example, ordinary measles vaccine which normally contains a small percentage of calcium chloride must be kept at temperatures lower than about $-60°$ C.; at higher temperature loss of antigenicity is prompt and essentially complete. In striking contrast to this, measles vaccine in accordance with the present invention can be kept conveniently at temperatures up to about $-20°$ C.; at these higher temperatures maximum stability is obtained. Additionally, the products of the invention can be subjected to successive freeze-and-thaw cycles without undue loss of antigenic potency.

The invention applies broadly to antigenic virus materials and especially includes virus materials, in dry or aqueous form, which either are vaccines or can be used for the production of vaccines or anti-sera.

Thus, the invention is applicable to virus vaccines broadly including live attenuated virus vaccines and killed virus vaccines. By way of illustration, some of the many vaccines to which the invention applies are poliomyelitis, measles, infectious hepatitis, yellow fever, mumps, rabies and smallpox vaccines. Such vaccines, which for purposes of the invention may be unstabilized or partly stabilized, are obtainable by conventional methods known to the art. The invention is also applicable to the stabilization of virus vaccine starting materials such as virus culture filtrates, centrifugates and the like, unfinished virus vaccines, vaccine pools and other antigenic materials in process. In the specification which follows, the invention will be described for purposes of illustration with particular emphasis on finished vaccines and the production thereof but it will be realized that the invention contemplates stabilized virus materials generally and is not limited to finished vaccines.

Calcium lactobionate is a relatively inexpensive material and is available commercially in a high state of purity. Technical grades are satisfactory, but refined grades approximating or exceeding the following typical analysis are preferred:

| | | |
|---|---|---|
| Calcium | percent | 4.94 |
| Moisture | do | 5.14 |
| Total reducing substances as lactose $H_2O$ | do | 0.27 |
| Heavy metals | p.p.m | 10 |
| pH (10% solution) | | 6.5–7.5 |

The proportion of calcium lactobionate to be incorporated in the virus products for stabilizing purposes is subject to variation depending on the density of the vaccine, the relative lability of the antigen present and other similar factors. Conveniently, the calcium lactobionate, in the form of a dry powder or dilute aqueous solution, is incorporated in the fluid virus material, with thorough mixing at low temperature to obtain a homogeneous suspension or solution. In general, a concentration of at least about 0.1% (w./v.) is employed. For maximum stability, a concentration of 1% (w./v.) is preferred. Concentrations as high as about 5% (w./v.) are also satisfactory; the invention contemplates the use of higher concentrations, although the desired stabilizing effect becomes increasingly less significant as the concentration is increased. Dry, stabilized products are suitably prepared from the mentioned fluid products by conventional drying procedures known to the art, such as freeze-drying or lyophilization. On a weight basis such non-aqueous products contain a high concentration of calcium lactobionate relative to the total solids content. The invention as indicated contemplates not only fluid, aqueous virus materials and vaccines but also dry, non-aqueous products such as may be prepared by drying the mentioned fluid products.

As an optional feature of the invention, to enhance the antigenic effect, the products may contain small amounts of added, immunogenically compatible protein or polypeptide such as human albumin, protamine, peptone and the like. For example, one may use about 1–5% (w./v.) of protein or polypeptide.

According to another embodiment of the invention which applies to the drying of fluid products and makes for not only greater ease in handling but also enhanced stabilizing effect, a small percentage [e.g., about 2–10% (w./v.), and preferably about 5%] of lactose, in addition to the calcium lactobionate, is incorporated with the fluid product prior to drying. The drying step is thereby facilitated in that the lactose advantageously affords a compatible and workable matrix. Moreover, dry products containing lactose are in general more stable antigenically than such products which do not contain lactose.

In accordance with conventional practice, the products of the invention are desirably processed under aseptic conditions using components which preliminarily have been rendered bacterially sterile. Sterility on storage can be maintained by incorporation of an antigen-compatible germicidal substance such as thimerosal or benzethonium chloride. However, for products which are reduced to the dry, non-aqueous state, the use of a germicide or sterilizing agent is ordinarily unnecessary. Unless otherwise indicated herein, the antigenic substances are preferably kept cold (about 4° C.) where possible during production.

The invention is illustrated but not limited by the following examples. The concentration of ingredients is given in weight per volume percentage, unless otherwise specified.

EXAMPLE 1

(a) *Preparation of tissue culture cells.*—Tissue culture cells, prepared from 11- to 12-day embryonated chicken eggs using standard trypsinization techniques, are grown in stationary bottles (28-ounce, prescription) for 3 to 5 days. The medium for growth of cells is synthetic medium No. 199. The cell monolayers are washed twice with 100-ml. quantities of medium No. 199 at pH 7.4–7.6 containing 1 microgram of streptomycin.

(b) *Inoculation of cells.*—After washing, 50 cc. of a solution containing 1,000 to 10,000 50% tissue culture infectious doses ($TCID_{50}$) of attenuated Edmonston strain of measles virus suspended in medium No. 199 are added to each tissue culture bottle. The virus strain is obtainable from the Research Division of Infectious Diseases, The Children's Medical Center, Boston, Mass. Cf. American Journal of Public Health, 47: 275–282 (1957); Connecticut Medicine, 23: 561–567 (1959).

(c) *Incubation.*—The inoculated cultures are incubated stationary at 32° C. until about ⅔ to ¾ of the monolayer undergoes a cytopathic effect, usually from 7 to 14 days following inoculation, at which time virus yield is optimal.

(d) *Harvest.*—The cell sheets from the incubated cultures are suspended in the fluids and collected into a common pool in a chilled container. The resulting suspension is centrifuged at 4° C. for ten minutes at 1500 r.p.m. The supernatant fluid is removed from the packed cell debris and, while cold, is passed through a filter (medium fritted glass) to eliminate any remaining small debris. The resulting supernate is suitable as a measles vaccine but is relatively unstable as regards antigenic potency when subjected to prolonged storage, successive freeze-and-thaw cycles, freeze-drying, etc.

The following is a description of the production of stabilized measles vaccines from antigen starting materials prepared in accordance with the foregoing procedure. Also described is a comparison of the antigenic behavior of unstabilized and stabilized measles vaccines when subjected to different environmental conditions encountered in freezing, drying and storage. The unstabilized vaccines used were supernatant fluids of the type obtained by the procedure of 1(d), referred to below as "control," and the same fluids to which human albumin (1%) was added, referred to below as "control with albumin."

*Stabilized vaccines.*—Separate aliquots of supernatant measles virus fluids obtained by the procedure of 1(d) were mixed respectively with calcium lactobionate (1%; refined grade, Sheffield Chemical Div., Sheffield Farms Co., Inc., Norwich, Conn.); with calcium lactobionate (1% and 5%) and human albumin (1%); and with calcium lactobionate (1%), human albumin (1%) and lactose (5%). In each case the ingredients were mixed thoroughly in the cold to provide a homogeneous liquid. The resulting products had the following composition based on total volume of vaccine.

Vaccine A: calcium lactobionate (1%)
Vaccine B: calcium lactobionate (1%), human albumin (1%)
Vaccine C: calcium lactobionate (5%), human albumin (1%)
Vaccine D: calcium lactobionate (1%), human allbumin (1%), lactose (5%).

Resistance to potency loss during freeze-drying was demonstrated by subjecting vaccines C and D, as well as a control vaccine to a conventional freeze-dying procedure (0° C.; Virtis dryer, model No. P–24–PR, Virtis Company, Inc.; Gardiner, N.Y.). The potency before and after drying, in terms of infectivity titer, was determined for each vaccine. This determination is carried out by inoculating monolayer cultures of chick embryo cells with an aliquot of the respective vaccine and observing the development of plaque formation in accordance with the procedure described by Dulbecco et al. J. Exper. Med., 99: 167, 1954. The infectivity titer, which relates directly to the antigenicity of the inoculum, is expressed as plaque formation units (PFU) per milliliter of vaccine. The following results were obtained:

Table 1

| Vaccine | Infectivity titer pre-dried | (PFU/ml.) dried |
| --- | --- | --- |
| Control with albumin | 33,110 | 5,888 |
| Vaccine C | 10,000 | 8,511 |
| Vaccine D | 19,950 | 18,200 |

These results show that whereas the stabilized measles vaccines C and D sustained only a moderate loss of potency during drying, the control vaccine which lacked a stabilizer lost over 80% of its potentcy.

The stabilizing effect when exposed to drying (sublimation under vacuum) and storage for seven days was also demonstrated. In this procedure several lots of vaccine B and a control with albumin were subjected to different drying temperatures (0° C., −40° C., and a range of 0 to −40° C.) and storage temperatures (+15° and −80° C.). The potency (infectivity titer) was determined at the beginning and end of each run. The following results were obtained:

Table 2

| Sublimation temp., °C. | Storage temp., °C. | Final infectivity titer (PFU/ml.) | |
|---|---|---|---|
| | | Control with albumin (Initial: 8,913,000) | Vaccine B (Initial: 8,913,000) |
| 0 | 15 | 5,248 | 2,138,000 |
| 0 | −80 | 31,620 | 2,951,000 |
| −40 | 15 | 5,248 | 1,288,000 |
| −40 | −80 | <5,012 | 2,239,000 |
| 0 to −40 | 15 | <5,012 | 1,698,000 |
| 0 to −40 | −80 | <5,012 | 2,512,000 |

These results show that the control vaccine lost over 99% of its initial potency in all cases. In contrast to this, the results also show that a vaccine stabilized in accordance with the invention retained significant potency during drying and storage.

Resistance to potency loss when subjected to cyclic freezing and thawing was also demonstrated. In this procedure, vaccine B and a control with albumin were successively frozen at −76° C. and thawed at +37.5° C. for 8 cycles. The potency of the vaccines was determined before the first cycle and after cycles 1, 2, 4 and 8, with the following results:

Table 3

| Freeze-thaw cycles | Infectivity titer (PFU/ml.) | |
|---|---|---|
| | Control with albumin | Vaccine B |
| 0 | 16,220,000 | 19,050,000 |
| 1 | 15,490,000 | 18,620,000 |
| 2 | 11,220,000 | 18,620,000 |
| 4 | 9,333,000 | 15,140,000 |
| 8 | 5,129,000 | 11,480,000 |

These results show that a vaccine according to the invention possessed good stability during cyclic freezing and thawing. Although this vaccine and a control vaccine both progressively lost potency as the number of cycles was increased, the former retained potency for the average cycle at a rate twice that of the control.

In a further demonstration, resistance to potency loss was shown for dried products in prolonged storage at 4° C. The products (measles control and vaccines A and B) after freeze-drying were placed in storage and assayed from time to time for potency, with the following result:

Table 4

| Storage time (weeks) | Control, pre-dried, 10,000 | Infectivity titer (PFU/ml.) | |
|---|---|---|---|
| | | Vaccine A, pre-dried, 12,590 | Vaccine B, pre-dried, 3,162 |
| 1 | 692 | | |
| 8 | | | 3,467 |
| 9 | 50 | | |
| 17 | <10 | | 3,800 |
| 19 | | 870 | |
| 28 | | 646 | |
| 40 | | | 3,310 |

These results show that a control vaccine without stabilizer loses substantially all antigenicity after four months' storage, whereas vaccines of the invention retain significant antigenicity over much longer periods.

In another demonstration, resistance to potency loss was shown for a frozen vaccine product held under storage in comparison with a control vaccine. Two temperatures were employed for freezing, with the following result:

Table 5

| Freezing Temperature, °C. | Storage temperature, °C. | Infectivity titer at intervals (PFU/ml.) | | | | | |
|---|---|---|---|---|---|---|---|
| | | Control vaccine | | | Vaccine B | | |
| | | 0 | 1 wk. | 1 mo. | 0 | 1 wk. | 1 mo. |
| −20 | −40 | 10,230,000 | 3,162,000 | 2,630,000 | 14,790,000 | 5,012,000 | 10,000,000 |
| −65 | −40 | 12,590,000 | 794,300 | 631,000 | 14,450,000 | 17,380,000 | 15,850,000 |

These results show that the unstabilized control vaccine stored at low temperature undergoes a major loss of potency, whereas under the same conditions the vaccine according to the invention retains, within the limits of experimental precision, its original potency without loss.

The stabilized measles vaccines prepared as described can be used directly for immunogenic purposes. A preferred product is a cell-free measles tissue culture fluid to which has been added 1% calcium lactobionate and 1% human albumin and which has been freeze-dried and packaged in single-dose vials, under aseptic conditions, to provide a minimum unit potency of 1000 PFU. Such a product, having good stability and being adapted for administration when reconstituted with water, has been found to be clinically effective.

The foregoing procedure can be used for the stabilization of other vaccines derived from different virus vaccine starting materials. For example, in place of measles vaccine one can use inactivated mumps virus vaccine [100 chicken cell agglutination (CCA) units per ml.] containing thimerosal (1:10,000). Specifically, calcium lactobionate (1%) and human albumin (1%) are added to this vaccine and the mixture stirred in the cold to provide a homogeneous solution. The solution is held at 4° C. and as required is filled into vials for distribution.

EXAMPLE 2

A cell-free vaccinia virus tissue culture supernatant fluid is prepared as follows: Using conventional trypsinization techniques, 7-day monolayer cultures of bovine embryonic skin are prepared. Synthetic medium No. 199 is added to the cultures and each culture is inoculated with 50 ml. of a suspension containing vaccinia virus (1000 $TCID_{50}$). The inoculated cultures are incubated for 4 to 7 days, and the fluids are harvested, pooled and centrifuged.

To determine the stabilizing effect of calcium lactobionate in vaccinia virus vaccine, one aliquot of the supernatant was maintained for control purposes and another aliquot was stabilized by admixture with calcium lactobionate to a concentration of 1%. The resulting stabilized vaccine and the control vaccine were each frozen and dried in a Virtis dryer. The antigenic potency in terms of infectivity titer was determined before and after freeze-drying, with the following results:

| | Infectivity titer (P.F.U/ml.) | |
| --- | --- | --- |
| | Before freeze-drying | After freeze-drying |
| Control vaccine | 3,981,000 | 1,585,000 |
| Vaccine stabilized with 1% calcium lactobionate | 4,169,000 | 5,000,000+ |

These results show that the unstabilized, control vaccine lost over half of its potency during freeze-drying. Under the same conditions, the vaccine stabilized with calcium lactobionate retained its potency at a high level without apparent loss.

The foregoing procedure can be used for the stabilization of other antigenic materials. For example, in place of vaccinia virus fluid, one can use an aqueous medium containing poliomyelitis virus antigen such as a monkey kidney tissue culture filtrate containing one or more of Types 1, 2 or 3 of poliomyelitis virus which has been killed partly by treatment with formaldehyde and partly by exposure to ultraviolet light (cf. British Patent No. 802,048); one can also use a centrifugate of chick embryo amniotic culture fluid containing mumps virus, infectivity (hemagglutination) titer $10^{-4}$.

While in the foregoing description we have set forth in detail embodiments of the present invention, it will be understood by those skilled in the art that considerable variation may be made in such detail without departing from the spirit of our invention.

We claim:

1. Process for the stabilization of labile, antigenic virus vaccine materials which comprises the step of incorporating with a fluid antigenic virus vaccine material at least 0.1% by weight of calcium lactobionate.

2. Process according to claim 1 where the fluid antigenic virus vaccine material is a vaccine.

3. Process for the stabilization of labile, antigenic virus vaccine materials which comprises mixing with a fluid antigenic virus vaccine material at least 0.1% by weight of calcium lactobionate and freezing the resulting mixture.

4. Process according to claim 3 where the fluid antigenic virus vaccine material is a vaccine.

5. Process according to claim 3 where the virus vaccine material is a cell-free live measles culture fluid.

6. Process according to claim 3 where the virus vaccine material is a cell-free live vaccinia virus culture fluid.

7. Process for the stabilization of labile, antigenic virus vaccine materials which comprises mixing with a fluid antigenic virus vaccine material at least 0.1% by weight of calcium lactobionate and freeze-drying the resulting mixture.

8. Process according to claim 7 where the virus vaccine material is a cell-free live measles culture fluid.

9. A stabilized fluid antigenic virus vaccine material containing at least 0.1% by weight of calcium lactobionate.

10. A stabilized fluid virus vaccine containing at least 0.1% by weight of calcium lactobionate.

11. A stabilized fluid antigenic virus vaccine material containing at least 0.1% by weight of calcium lactobionate and from 2–10% by weight of lactose.

12. A dry, stable virus vaccine prepared by freeze-drying a fluid antigenic virus vaccine material containing at least 0.1% by weight of calcium lactobionate and from 2–10% by weight of lactose.

13. A dry, stable live measles vaccine prepared by freeze-drying a cell-free live measles culture fluid containing 1% by weight of calcium lactobionate and 1% by weight of human albumin.

References Cited by the Examiner

UNITED STATES PATENTS

| | | | |
| --- | --- | --- | --- |
| 2,186,975 | 1/40 | Isbell | 260—535 |
| 2,879,202 | 3/59 | Aiston et al. | 167—78 |
| 2,912,361 | 11/59 | Froelich | 167—78 |
| 2,946,724 | 7/60 | Valentine | 167—78 |
| 3,031,378 | 4/62 | Ishidate et al. | 167—78 |

FOREIGN PATENTS

| | | |
| --- | --- | --- |
| 603,832 | 8/60 | Canada. |
| 716,920 | 10/54 | Great Britain. |
| 899,011 | 6/62 | Great Britain. |
| 900,115 | 7/62 | Great Britain. |

OTHER REFERENCES

Soap and Chem. Specialties, vol. 33, No. 9, pp. 47–49 (1957).

Virology, vol. 16, pp. 122–132; 504–506 (1962).

Virology, vol. 18, pp. 495–497 (1962).

LEWIS GOTTS, *Primary Examiner.*

FRANK CACCIAPAGLIA, Jr., *Examiner.*